United States Patent [19]

Lurie

[11] Patent Number: 4,626,904
[45] Date of Patent: Dec. 2, 1986

[54] METER FOR PASSIVELY LOGGING THE PRESENCE AND IDENTITY OF TV VIEWERS

[75] Inventor: Oscar M. Lurie, Bethesda, Md.

[73] Assignee: Control Data Corporation, Minneapolis, Minn.

[21] Appl. No.: 797,344

[22] Filed: Nov. 12, 1985

[51] Int. Cl.$^4$ ............................................. H04H 9/00
[52] U.S. Cl. ............................................. 358/84; 455/2
[58] Field of Search ............... 179/2 AS; 358/84; 381/25, 74; 455/2; 340/825.49

[56] References Cited

U.S. PATENT DOCUMENTS

| 4,225,953 | 9/1980 | Simon et al. | 340/825.49 X |
| 4,275,385 | 6/1981 | White | 340/825.49 |
| 4,435,845 | 3/1984 | Timm et al. | |
| 4,495,496 | 1/1985 | Miller, III | 340/825.49 X |
| 4,546,382 | 10/1985 | McKenna et al. | 358/84 |
| 4,566,030 | 1/1986 | Nickerson et al. | 358/84 |
| 4,573,072 | 2/1986 | Freeman | 358/84 X |
| 4,578,700 | 3/1986 | Roberts et al. | 358/84 |
| 4,591,906 | 5/1986 | Morales-Garza et al. | 358/84 |
| 4,596,041 | 6/1986 | Mack | 455/2 X |

FOREIGN PATENT DOCUMENTS

| 2404074 | 8/1975 | Fed. Rep. of Germany | 358/84 |
| 1536414 | 12/1978 | United Kingdom | 455/2 |

Primary Examiner—Keith E. George
Attorney, Agent, or Firm—J. A. Genovese; E. P. Heller

[57] ABSTRACT

A meter for passively logging the presence of TV viewers including circuitry for disabling the audio of a TV set, a transmitter for wirelessly transmitting the audio to a plurality of headphones, a circuit responsive to the headphones presence upon the head of a viewer for transmitting a headphone ID signal to a monitor, a receiver in the monitor for logging the fact that particular headphones are activated, and a time of day clock for logging the period of time particular headphones are activated.

16 Claims, 3 Drawing Figures

METER FOR PASSIVELY LOGGING THE PRESENCE AND IDENTITY OF TV VIEWERS

BACKGROUND OF THE INVENTION

1. Field of the Invention

The invention relates generally to the field of television program ratings measurement and more particularly to apparatus for identifying the viewing audience watching TV programs and commercials.

2. Brief Description of the Prior Art

Conventional automatic television ratings monitors include meters to record which channel a TV set is tuned to and the time of day it is so tuned. At a later time, the contents of the log are transmitted to a central computer via telephone lines where local and national program ratings are computed. Conventional meters cannot usually record the composition of the audience actually watching a particular program and cannot discern whether anyone is watching the program or commercials even though the TV set is on and tuned to a particular channel. For this reason, there is a need for apparatus capable of passive, automatic monitoring of the actual viewing audience.

Various meters for automatic monitoring of the viewing audience, otherwise known as "people meters," have been developed by such companies as Arbitron, Nielsen, Audits of Great Britain, Burke, Market index of Finland, and possibly others. Each of these devices requires the active participation of the viewers, and that the viewers must operate push buttons in response to "prompter" signals or when he leaves or returns to watching the TV set. The arrangements for button pushing vary, as do the "prompts" which automatically appear with some of the devices to remind the viewers to push their buttons. However, none of the "prompter" or push button arrangements have been altogether satisfying in audience measuring systems.

SUMMARY OF THE INVENTION

The present invention provides a television receiver having one or more headphones in wireless communication therewith. Each headphone includes position sensor means to detect the placement of the headphones on a wearer's head, receiver means responsive to said sensor means for receiving the wirelessly transmitted audio portion of the program and providing it to the wearer, and identification means responsive to the sensor means for transmitting a signal representative of each headphone. Monitor means connected to the television receiver includes storage means for storing activity status of the headphones, together with clock means for recording times of such activities.

According to one form of the invention, each headphone transmits its signal using unique optical filters and the monitor discriminates among the various headphones by corresponding filters. Another variation includes transmission of a timing signal to the headphones whereby each headphone begins a unique delay to the time when it responds with its own signal.

Another feature of the invention includes spare or guest headphone identifying means by which a family member with a malfunctioning headphone or a guest may log information concerning himself into a store and have a code for a spare headphone wirelessly transmitted to a spare headphone to activate it. The spare remains activated until the sensor indicates the spare has been removed from the head of the viewer.

In another form of the invention, the wireless communications means includes means to poll the headphones using a headphone unique ID signal. A headphone addressed by the poll responds with an acknowledge signal. Guest and spare headphones may be included in the poll list by the viewer using pushbuttons mounted on the monitor to identify himself and the headphone he intends to use.

Another feature includes voice means in the headphone to identify the headphone to the viewer when he puts on the headphone so that the viewer does not accidentally use the wrong headphone.

Non audio signals transmitted to the headphones are preferably multiplexed with the radiated audio signal.

The invention is intended to operate in conjunction with equipment that monitors the ON/OFF status of the TV set and the channel to which the set is tuned from time to time.

DESCRIPTION OF THE PREFERRED EMBODIMENT

Figure 1:
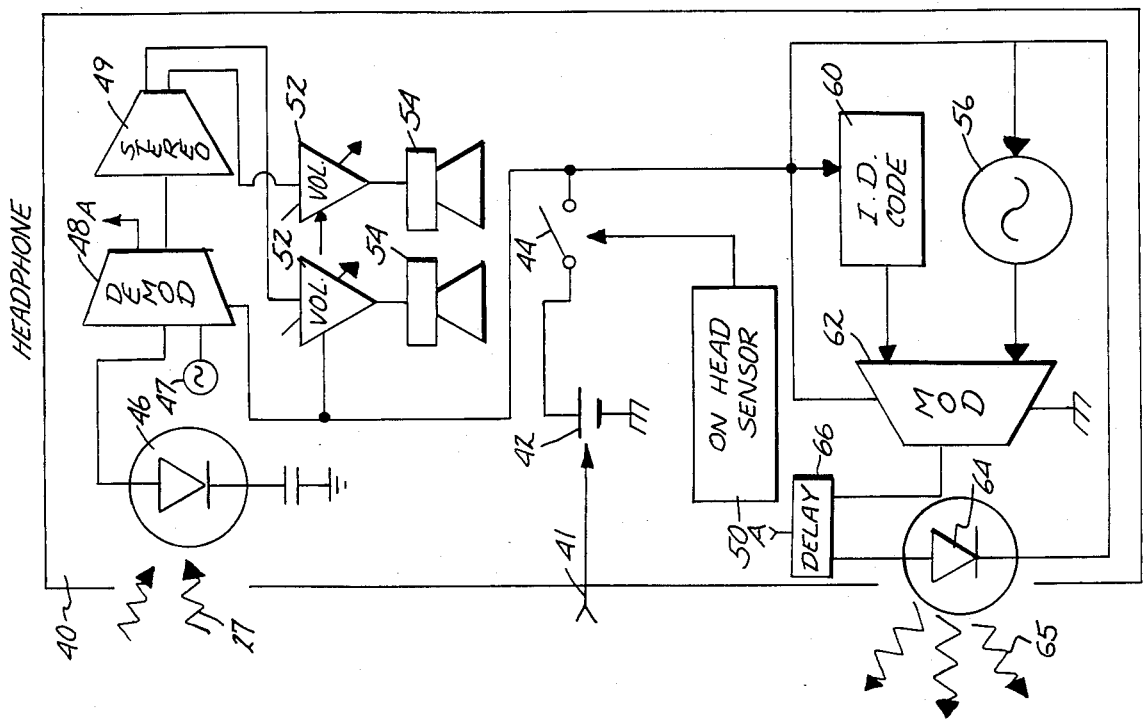
FIG. 1 is a schematic diagram of a passive viewer meter according to the presently preferred embodiment of the present invention.
Figure 1:
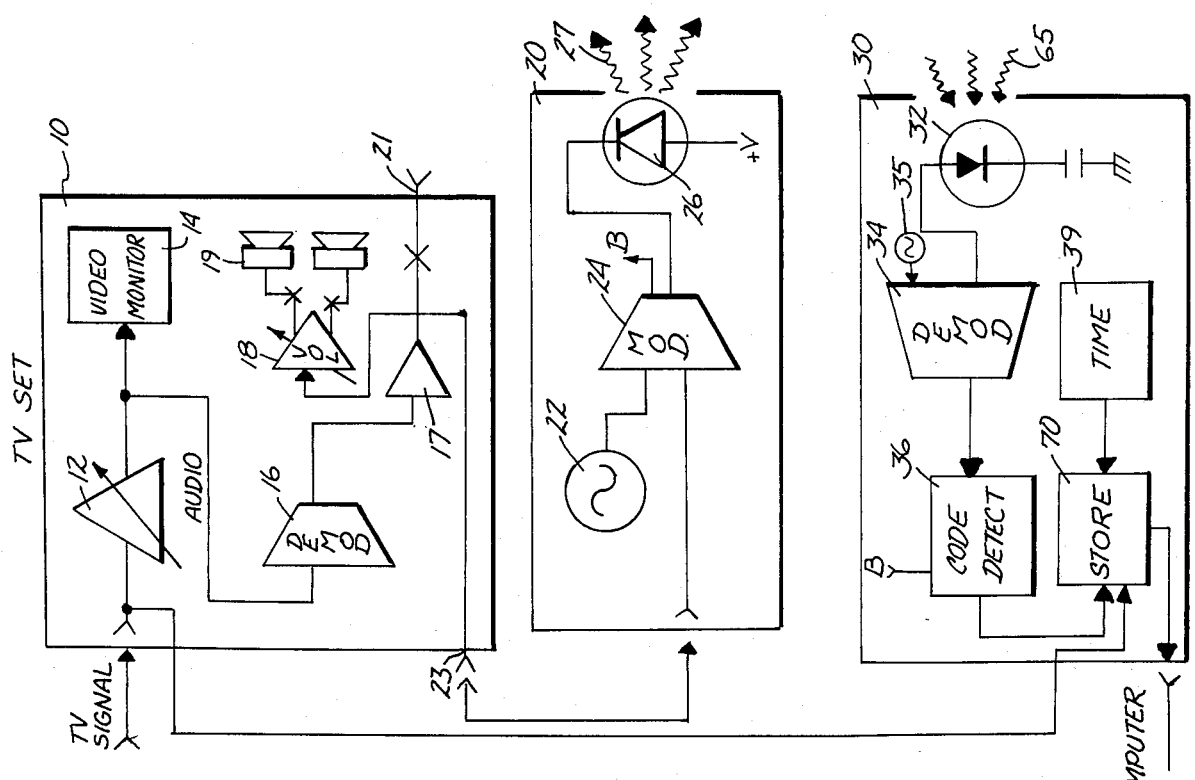

FIG. 1 illustrates a passive viewer meter in accordance with the presently preferred embodiment of the present invention. The system includes TV set 10 being viewed; converter 20 to transmit the audio portion of the television program; monitor 30; and at least one headphone 40 adapted to receive and demodulate the transmitted audio portion of the program and present it to the headphone's speakers.

TV set 10 typically comprises a tuner 12 for tuning to one of a set of frequencies either in the VHF or UHF ranges. The tuner's output comprises separable audio and video signals. The video signal is input to a video monitor 14 television screen. The audio signal is demodulated at 16, amplified at 17 and provided to drive speakers 19 through a volume control 18. Some TV receivers include headphone jacks 21 and audio outputs 23. In either case, these outputs would be connected to the audio amplifier 17. Also, some receivers are capable of receiving stereo broadcast signals, in which case there will be multiple audio channels.

In accordance with the present invention, speakers 19 are disconnected from volume control 18, and headphone jacks 21 are disconnected from the audio amplifier 17. Converter 20 is connected to audio output 23, or to amplifier 17 if audio output 23 is not present.

Converter 20 includes a carrier signal generator 22 which generates a carrier signal typically in the range of 40 khz or more for infrared transmission system and a modulator 24 for modulating the carrier with the audio from the TV set. The output of the modulator is provided to an infrared radiating LED 26 which transmits the audio modulated carrier at infrared frequencies as shown at 27. In a typical home environment, a plurality of such diodes are employed, directed in multiple directions so the radiated information will reach the infrared detector on the headphone(s) at a good power level regardless of the orientation of the viewer's head vis-a-vis the TV set.

While the amplitude modulation is shown here and throughout this description, it is understood that other forms of modulation and/or encoding will work equally as well and are deemed within the scope of the present invention. Other forms of modulation include frequency, pulse code and digital, either of the form having a self-clocking code or of the form having a transmitted carrier.

Headphone 40 includes a rechargeable battery 42 having a plug 41 for recharging the headphone's battery when the headphone is not in use. A rack (not shown) may be provided to house the headphones, the rack including a plurality of plugs for recharging the headphone's batteries when not in use.

The output of battery 42 is connected through normally open switch 44 to the other operable devices of the headphone. Switch 44 is closed when the on-head position sensor (detector) 50 determines that the headphone is positioned on the head of a viewer. When the switch 44 is closed by the on-head sensor 50, power is connected to the reception and amplifying components. This permits the transmitted infrared signal 27 bearing the modulated audio signal to be received by an infrared detector diode 46 and demodulated by demodulator 48 under the influence of oscillator 47, matched to the carrier frequency provided by oscillator 22, the output of which is input to a stereo decoder 49 and volume controls 52. Preferably, the volume controls are manually operated from controls (not shown) mounted on the headphone. The output from the volume controls are connected to the headphone's speakers 54.

On-head sensor 50 comprises any suitable device for sensing the position of the headphones on the head of a viewer, such as a differential heat sensor for sensing the body heat of the wearer, or microswitches mounted to the ear pad or head band of the headphone to detect pressure against the user's head. It is preferred the sensor be a low power consuming sensor becasuse it is preferably permanently connected to batteries 41. Carrier signal generator 56 is connected to switch 44 to generate a carrier signal. Code generator 60 provides a modulation signal in the form of a code unique for that headphone unit. The carrier and modulation signals are modulated by modulator 62 and transmitted by LED 64 to monitor 30. The LED preferably transmits signal 65 in the visible range; however, if infrared is used, the carrier must be sufficiently separated in frequency from the carrier of the audio signal infrared signal so as to not cause interference.

Monitor 30 includes a visible or infrared light detector 32 which detects the modulated visible light signal 65 transmitted by the LED 64 and inputs it to a demodulator 34, which demodulates the headphone identification signal from the carrier. The demodulated headphone ID signal is input to code detect circuit 36, which decodes the code. The output of the code detect is provided to store 70, where it is stored, together with the time of day from a time of day clock 39. Channel information is inputted to store 70 from the TV set tuning monitor with which this invention is intended to operate. Optimally, the apparatus of FIG. 1 may be modified by the inclusion of delay circuit 66 between modulator 62 and LED 64, delay 66 being connected to demodulator 48. Also, modulator 24 in converter 20 would be connected to code detect 36 in monitor 30. At preselected intervals (e.g., each 30 seconds) converter 20 transmits a timing signal to all headphones via LED 26 and detector diodes 46. The timing signal is demodulated by demodulator 48 which in turn operates delay circuit 66 to close the connection between modulator 62 and LED 64 after a selected delay and to open the connection shortly thereafter. If each headphone 40 employs a different delay period, each operating headphone will transmit a signal from its LED 64 to detector 32 during a unique time period. The "window" for transmission would be sensed by code detector 36, initiated by modulator 24.

A variation of this optional delay mechanism would include elimination of unique identification codes for the individual headphones and permit identification to be based on the window established by the unique delays.

Another variation would be to employ unique frequencies for carrier communication from LED 64 with a plurality of photocells 32 responsive to individual frequencies for direct input to code detector 36. For example, if each LED 64 emitted a unique color in the visual spectrum, the plurality of photocells with light filters would receive indication only from selected headphones. The several photocells would provide direct input to code detector 36.

If more than one headphone is present for viewers to use, as normally would be the case, the demographic information concerning the wearer of a given headphone (such as age and sex) is recorded in the store 70 and/or code detect 36. In the case of headphones for family members this data could be inputted to store 70 or to the central collection computer at the time of installation of the meter system. In the case of spare and guest headphone, demographic data of the user would have to be recorded along with the headphone ID number at the time viewing commenced. Demographic data can be inputted to store 70 by a keyboard, such as shown in FIG. 2.

Preferably, the spare or guest headphones would not be operable to receive audio unless enabled by the monitor in response to the entry of the demographic data. This requires transmitting a headphone unique ID signal from the monitor to a particular headphone to enable its reception of audio. FIG. 2 illustrates an embodiment for transmitting coded signals to the headphones. The coded signals comprise the aforementioned timing signal or a headphone unique ID signal. As shown in FIG. 2, microprocessor 82 is connected to store 70 and ID modulator 94. Microprocessor 82 receives optional input from keyboard 90, for example, to input demographic data concerning users. A timer may be part of the microprocessor, or be connected to store 70, as in the case of FIG. 1.

The audio signal from the TV set is connected, as before, to modulator 24, which imposes the audio signal on a carrier from oscillator 22. In FIG. 2, however, the output of oscillator 22 is provided to divide-by-three circuit 92 and directly to modulator 94. Modulator 94 modulates the headphone ID signal from microprocessor 82 to the carrier provided by oscillator 22. Thus, the carrier frequency modulating the headphone ID signal is three times that of the carrier modulating the audio. The two modulated carriers are mixed in mixer 96 and are transmitted by LED 26 driven by driver 98.

Figure 2:
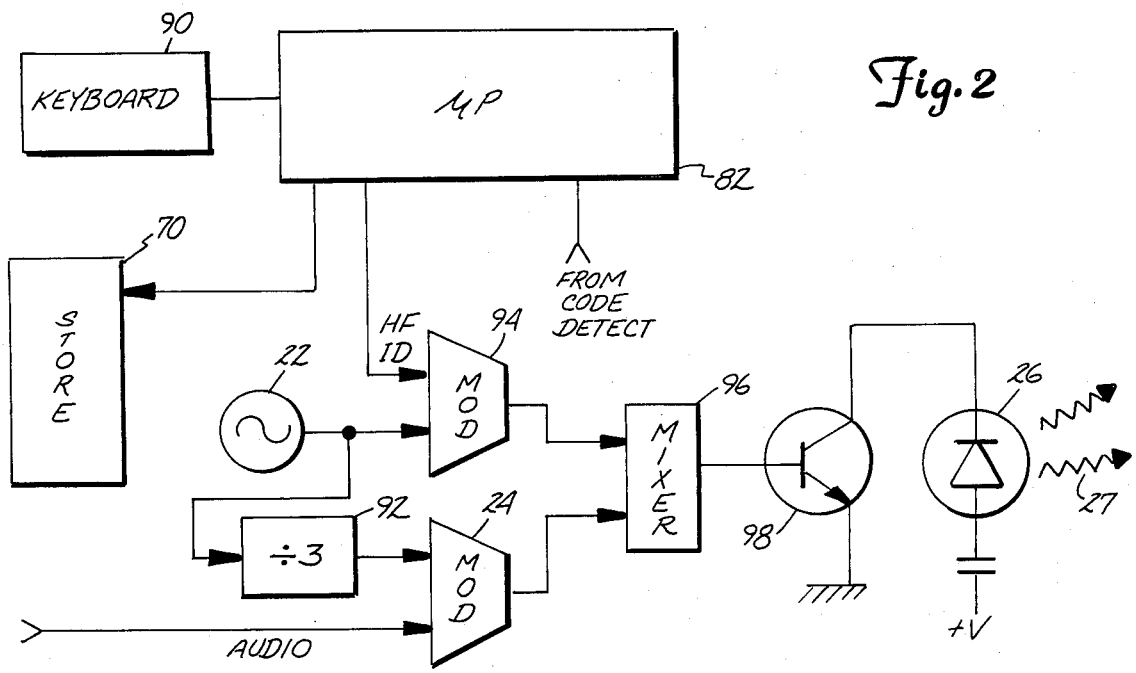
FIG. 2 is a schematic diagram of the monitor of a passive viewer meter according to a modification of the present invention.
Figure 3:
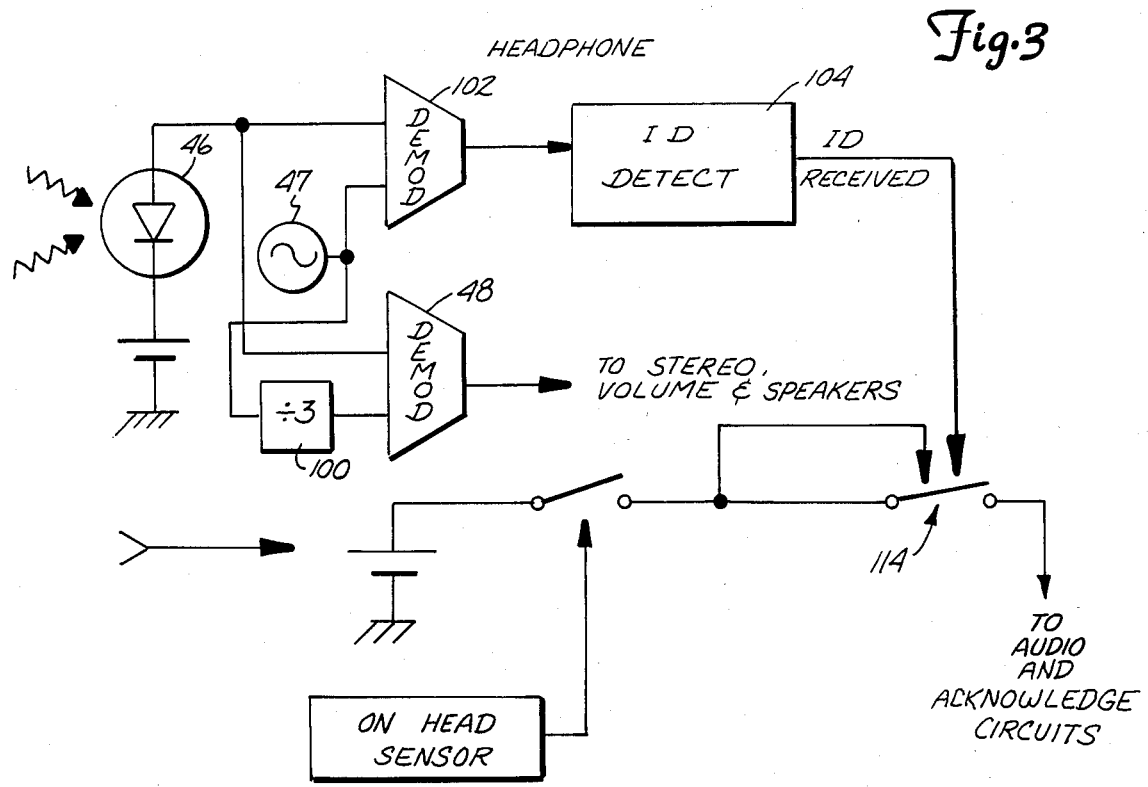
FIG. 3 is a partial schematic diagram of a headphone for use with the monitor shown in FIG. 2.

FIG. 3 illustrates the headphone useful with the apparatus shown in FIG. 2. As in the case of the apparatus shown in FIG. 1, the modulated audio carrier is detected by detector diode 46 and input to demodulator 48 which demodulates the audio for later stereo decoding, amplification and aural transduction as heretofore described. The oscillator 47 is running at three times the carrier frequency of the received audio signal, so divide-by-three circuit 100 is provided to enable demodulation. An additional demodulator 102 demodulates the timing or the headphone unique ID signal transmitted from the monitor at a carrier frequency three times that of the audio carrier. Thus the oscillator 47 is input directly to the second demodulator 102. ID detect circuit 104 compares the received headphone ID code with the unique code for the headphone, and if a match is detected, ID detect circuit 104 sends an ID recognized signal to switch 114, closing it and enabling power to the audio and/or acknowledge circuitry. Switch 114 is held closed by power from the battery through switch 44. Upon opening switch 44 (for example, upon removal of the headphones) switch 114 is also opened.

The circuitry of FIGS. 2 and 3 may also be useful in a polling arrangement wherein the headphones are polled with a headphone unique ID signal. When a headphone receiver recognizes its ID, it responds with an acknowledge signal. New polls are sent after a previous poll has been acknowledged. Thus, the possibility of two headphones trying to transmit simultaneously is eliminated. The microprocessor contains data for each headphone and generates a headphone identification signal for polling the headphones.

The acknowledge circuitry for the polling arrangement would include ID code generator 60, oscillator 56, modulator 62 and LED 64 all shown in FIG. 1. Thus, upon receipt of the poll signal, the headphone acknowledges by transmission of its ID code or an acknowledge code as heretofore described. Guest or spare headphones are included in the poll list in response to the viewer keying in the headphone number when identifying himself. After one or more failures to acknowledge the poll signal, the headphone is removed from the list. If the guest thereafter wishes to recommence viewing, he must identify himself again.

A final feature of the present invention includes a voice synthesizer actuated by the on-head sensor and connected to the headphone speakers for audible identification of the headphone. When the viewer first puts his headphone on, the synthesizer would say "Dad", "Mom", "Red" or the like.

I claim:

1. Apparatus for recording the presence and identity of the audience of a television set comprising transmitter means associated with said television set for transmitting a signal containing the audio portion of a program to which the television set is tuned; individual receiver means for each person comprising said audience, said individual receiver means including sensor means for sensing the positioning of said individual receiver means on a respective person, audio receiver means for receiving the transmitted signal from said transmitter means and for providing the audio portion of the program to the respective person, and identification means responsive to said sensor means for transmitting an identification signal representative of the individual receiver means; and monitor means for receiving and recording identification signals from all of said individual receiver means.

2. Apparatus according to claim 1 wherein said audio receiver mean is additionally responsive to said sensor means.

3. Apparatus for logging the presence and identity of viewers of a TV set, comprising:

a tuner for tuning a TV program comprising audio and video signals;
means for wirelessly transmitting the audio signal;
at least one headphone means for receiving and converting to audible audio the wirelessly transmitted audio signal; the headphone means including
sensor means for determining when the headphone means is positioned on the head of a viewer; and
wireless response means responsive to said sensor means for wirelessly transmitting signals representative of the headphone; and
monitor means for monitoring the presence of viewers watching the TV set, including
logging means for receiving the representative signal transmitted by the responding of said at least one headphone means and for storing the time of day the responding headphone means was present on the head of a viewer.

4. The apparatus of claim 3 wherein said headphone means includes rechargeable batteries.

5. The apparatus of claim 3 wherein said wireless response means includes means for transmitting a signal on a unique frequency.

6. The apparatus of claim 3 wherein said wireless transmission means includes means for modulating an LED.

7. The apparatus of claim 3 further including means for transmitting a timing signal to the headphone means and said headphone means further includes delay means responsive to the receipt of said timing signal for enabling for a short time said wireless response means a predetermined time after the receipt of said timing signal.

8. The apparatus of claim 7 wherein there are a plurality of said headphone means and the predetermined delay in each of said headphone means is unique.

9. The apparatus of claim 3 wherein said transmission means comprises modulating a carrier signal with said audio signal.

10. The apparatus of claim 3 further including means for transmitting a headphone unique identification (ID) number signal signal to said one or more headphones and the headphone means includes ID detect means for receiving and responding only to its unique ID signal by enabling the conversion of the audio signal to audible audio.

11. The apparatus of claim 10 further including keyboard means for inputting and storing the headphone unique ID number of a spare headphone means and the identification of a viewer wishing to use the spare headphone means.

12. The apparatus of claim 11 wherein said ID detect means further enables said wireless response means.

13. The apparatus of claim 12 further including polling means for periodically transmitting ones of a list of said headphone unique ID signals; and said wireless response means transmits an acknowledge signal when enabled by said ID detect means.

14. The apparatus of claim 13 wherein the headphone unique ID signal of a spare is included in the poll list in response the the keying in of the spare's headphone unique ID number and viewer identification and is removed from the list in response to the failure to receive a predetermined number of acknowledgements in response to that spare headphones means being polled.

15. The apparatus of claim 1 further including means for disabling audible audio outputs from the TV set.

16. The apparatus of claim 3 further including means for disabling audible audio outputs from the TV set.

* * * * *